No. 785,314. PATENTED MAR. 21, 1905.
H. LUSCHAR.
CARVING MACHINE.
APPLICATION FILED DEC. 12, 1904.
11 SHEETS—SHEET 1.
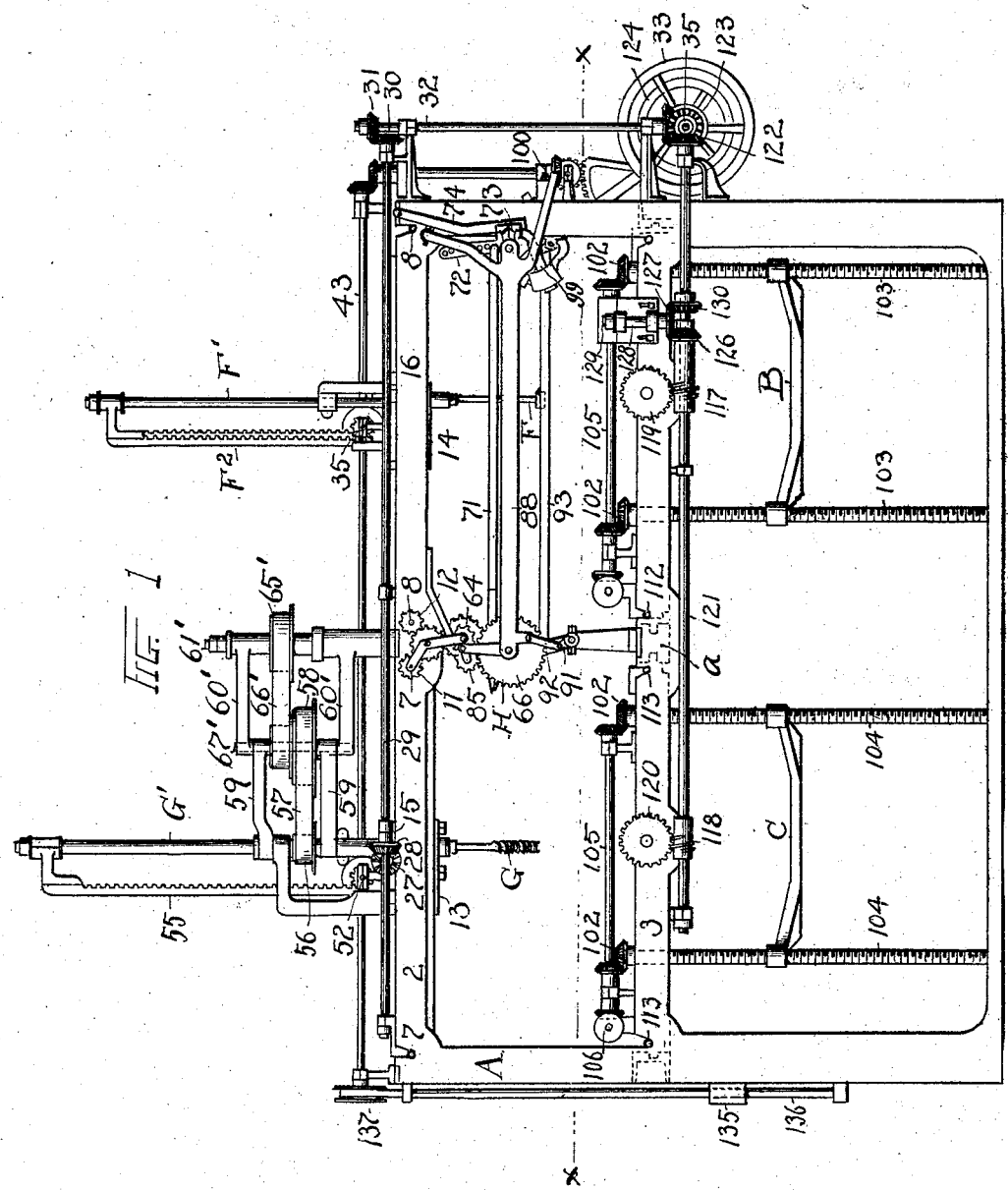
WITNESSES:
INVENTOR.
Hermann Luschar
BY H. J. Fisler
ATTORNEY.

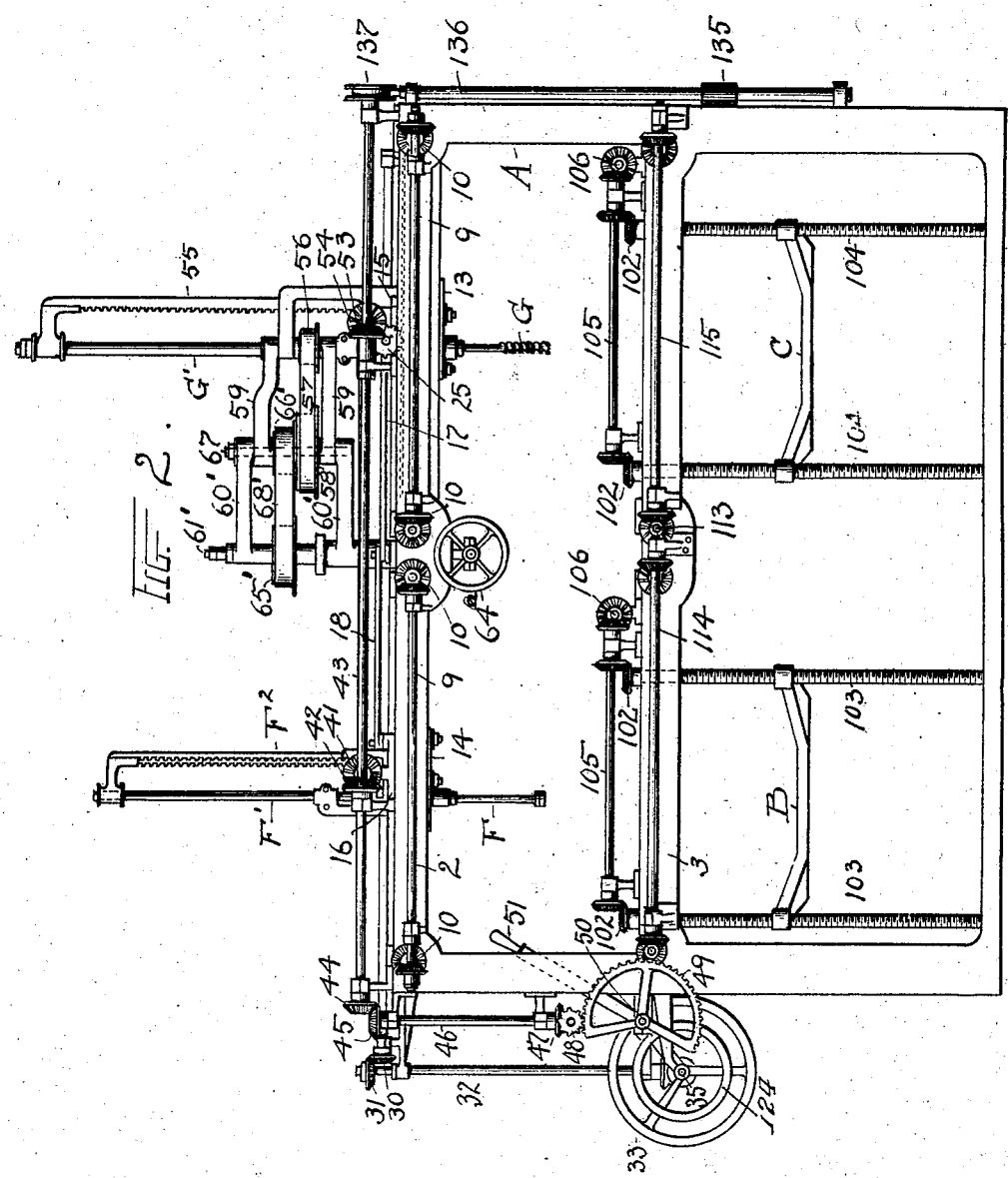

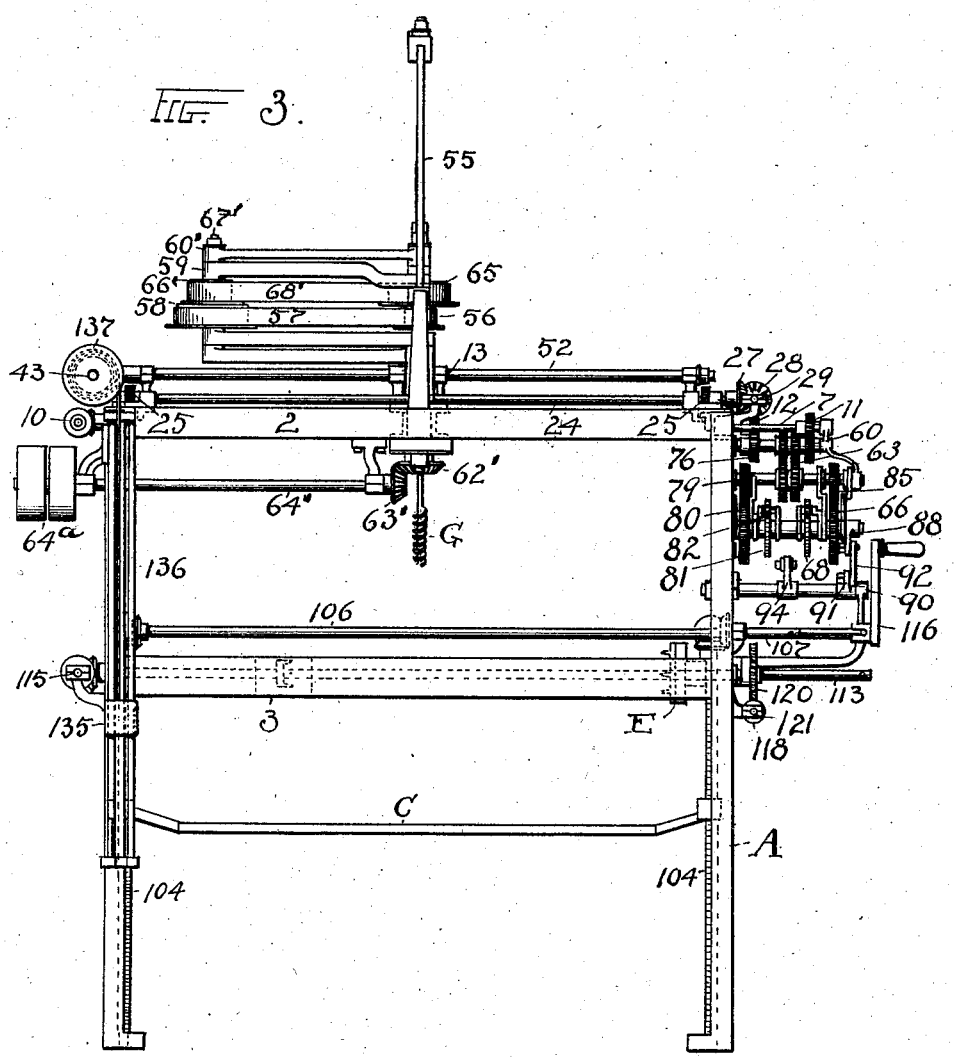

No. 785,314. PATENTED MAR. 21, 1905.
H. LUSCHAR.
CARVING MACHINE.
APPLICATION FILED DEC. 12, 1904.
11 SHEETS—SHEET 4.
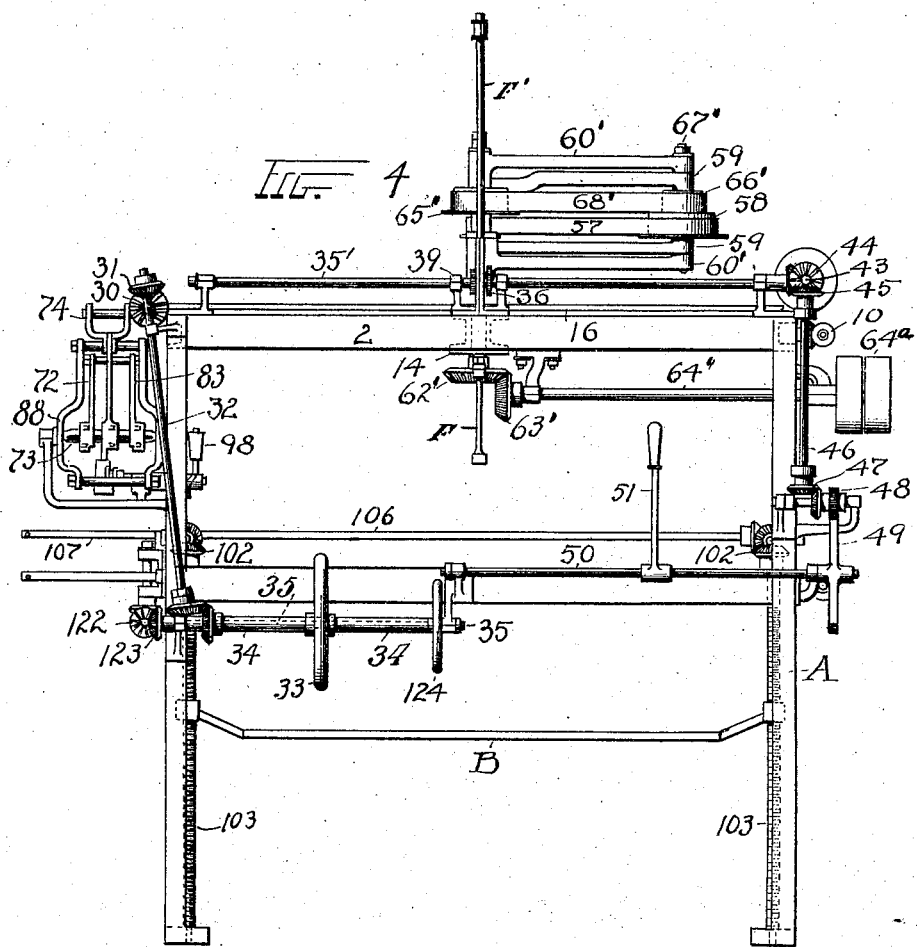
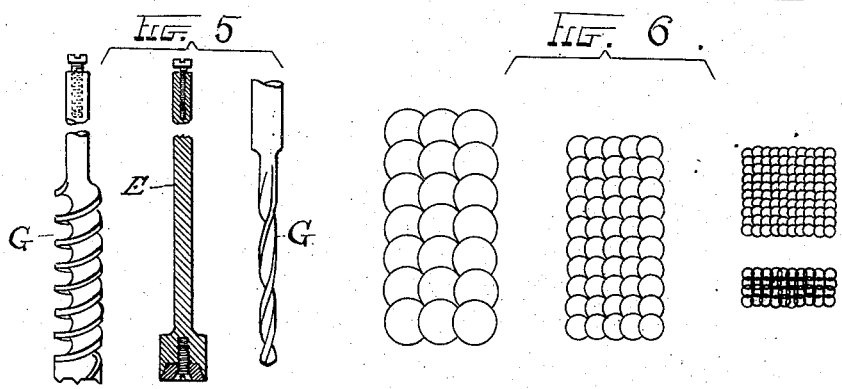
WITNESSES:
INVENTOR.
Hermann Luschar
BY H. J. Fischer
ATTORNEY.

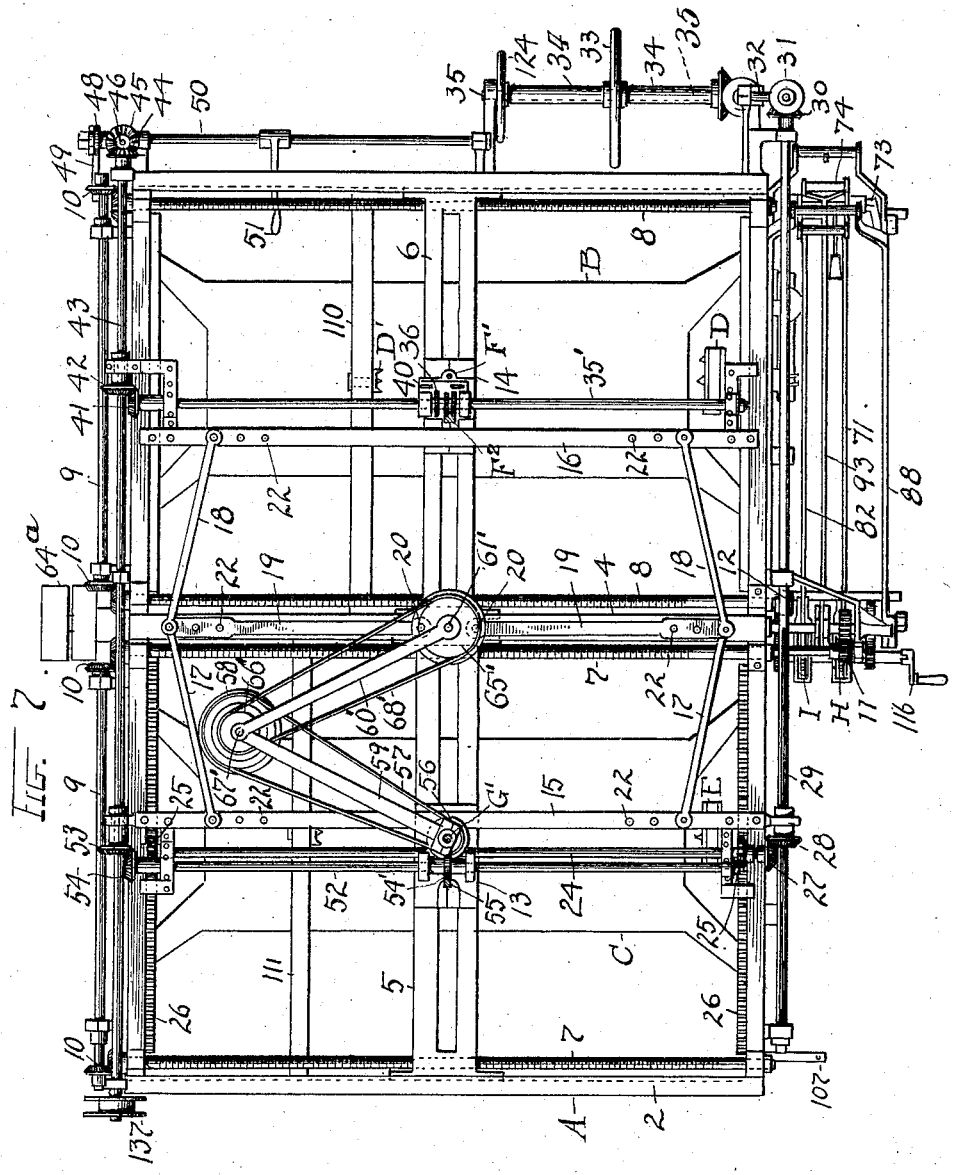

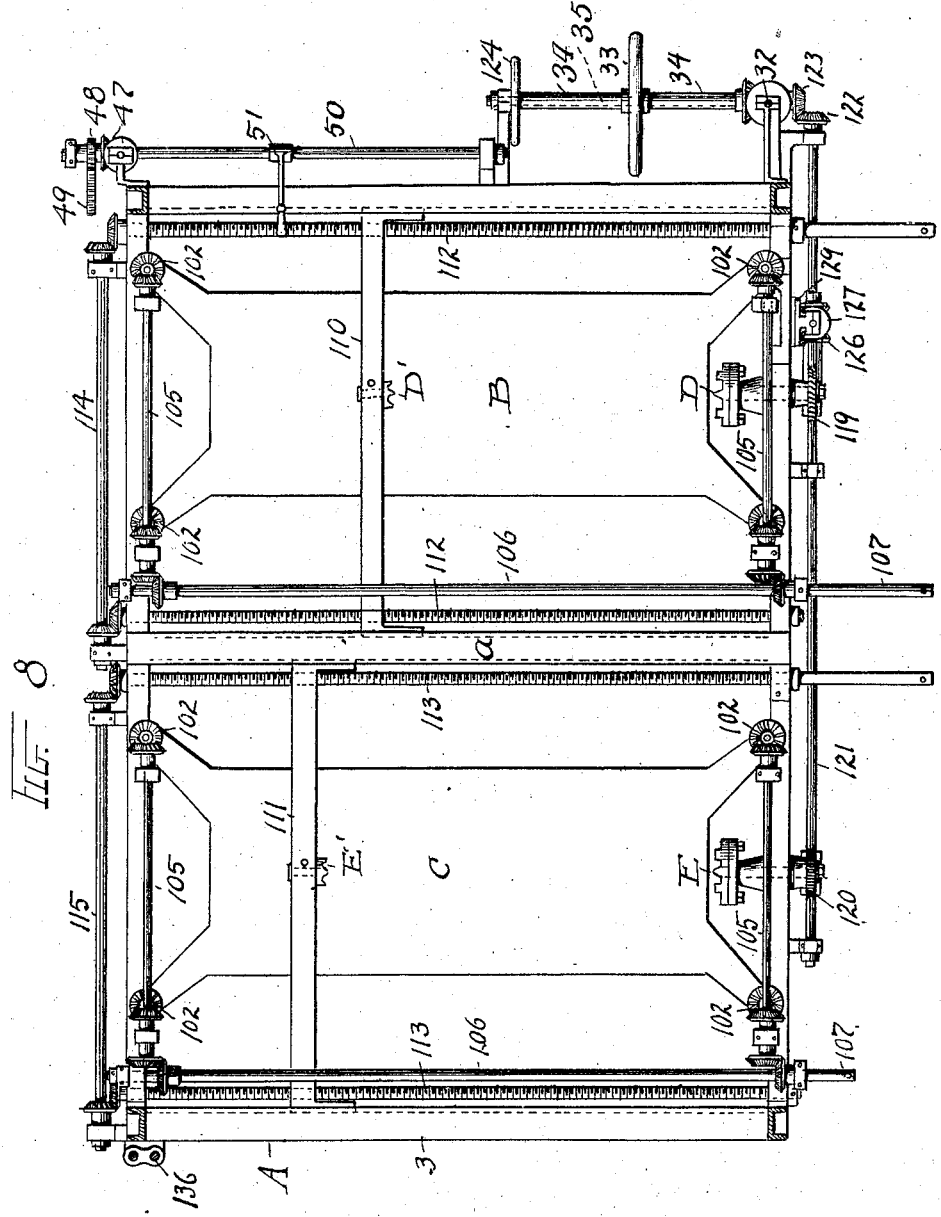

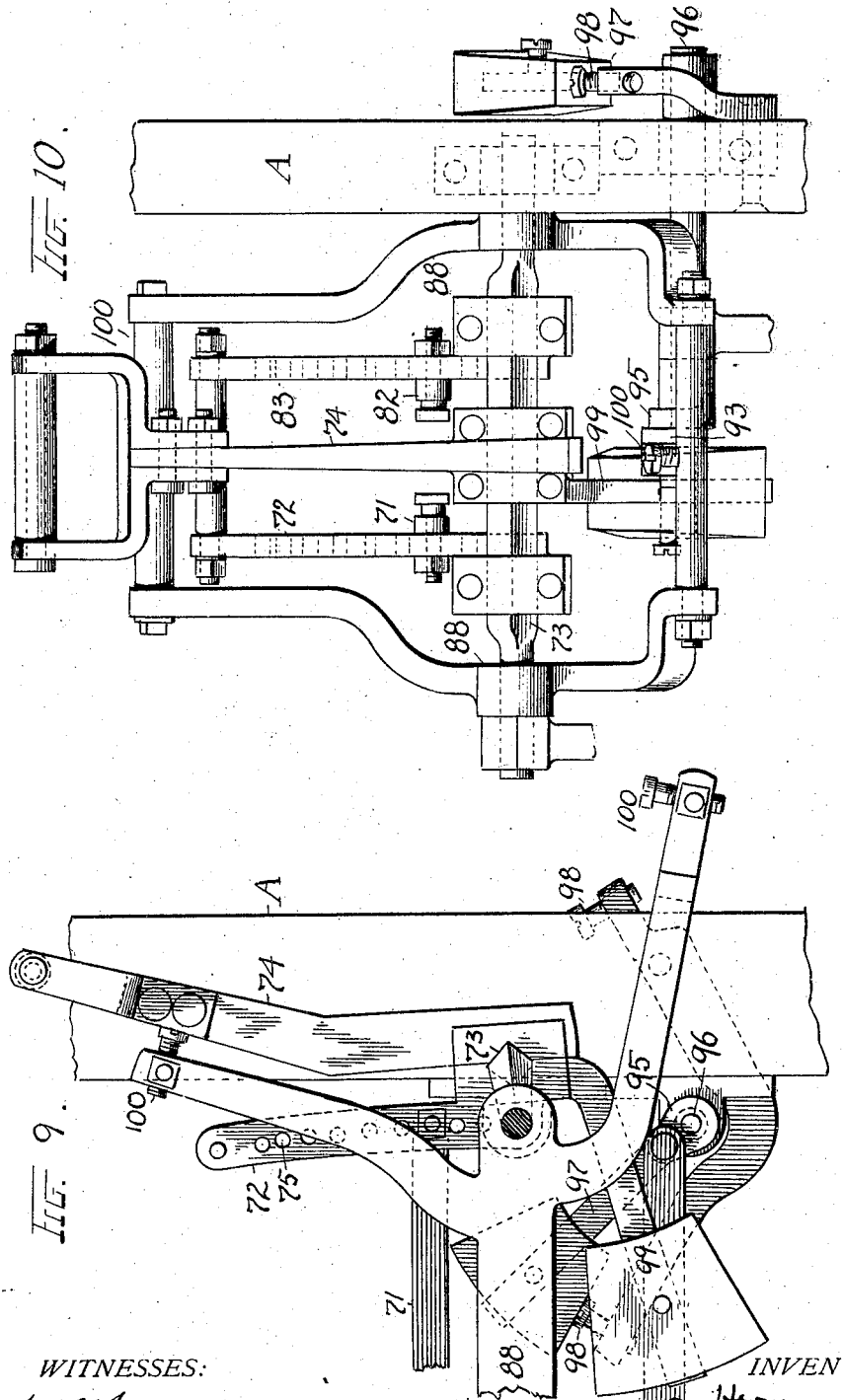

No. 785,314. PATENTED MAR. 21, 1905.
H. LUSCHAR.
CARVING MACHINE.
APPLICATION FILED DEC. 12, 1904.
11 SHEETS—SHEET 8.
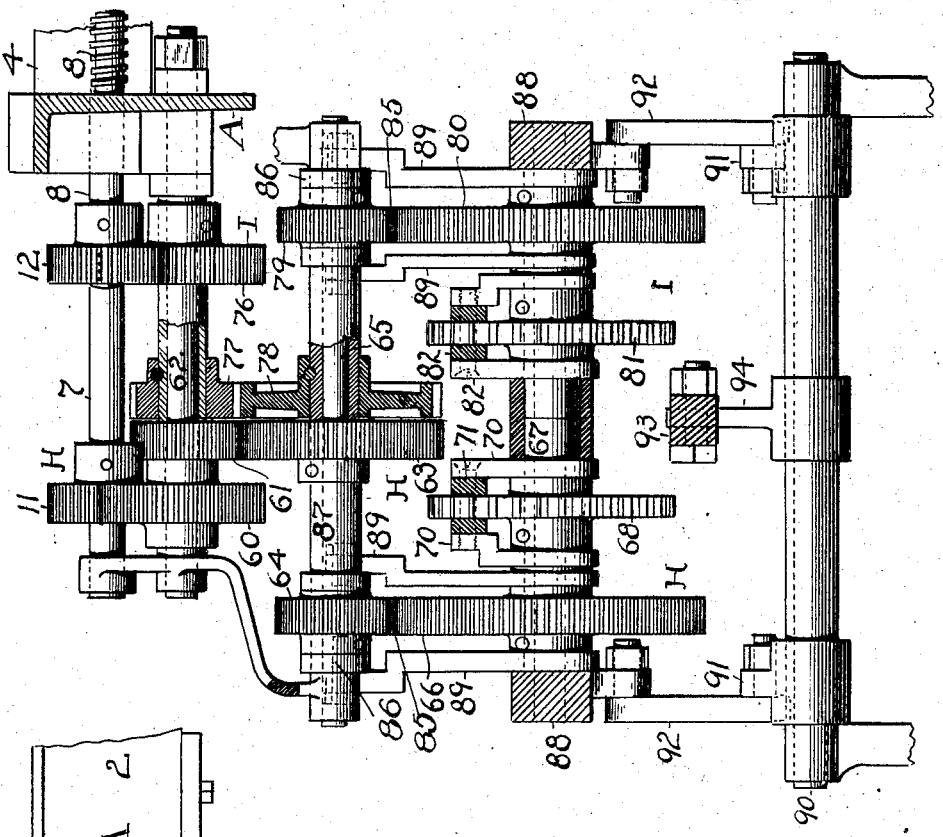
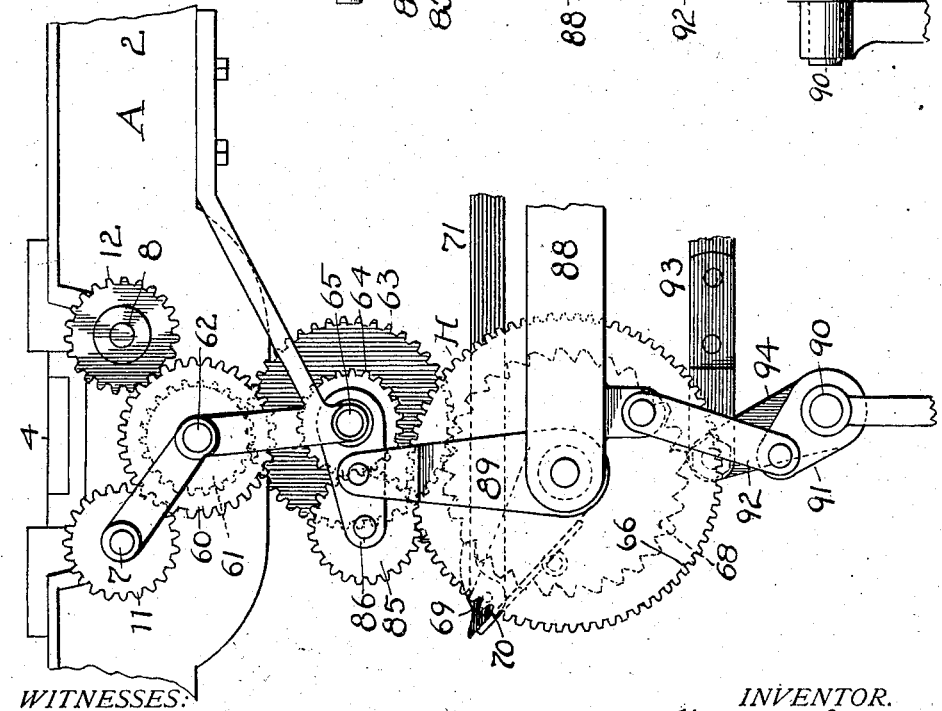
WITNESSES.
INVENTOR.
Hermann Luschar
BY H. T. Fisher
ATTORNEY.

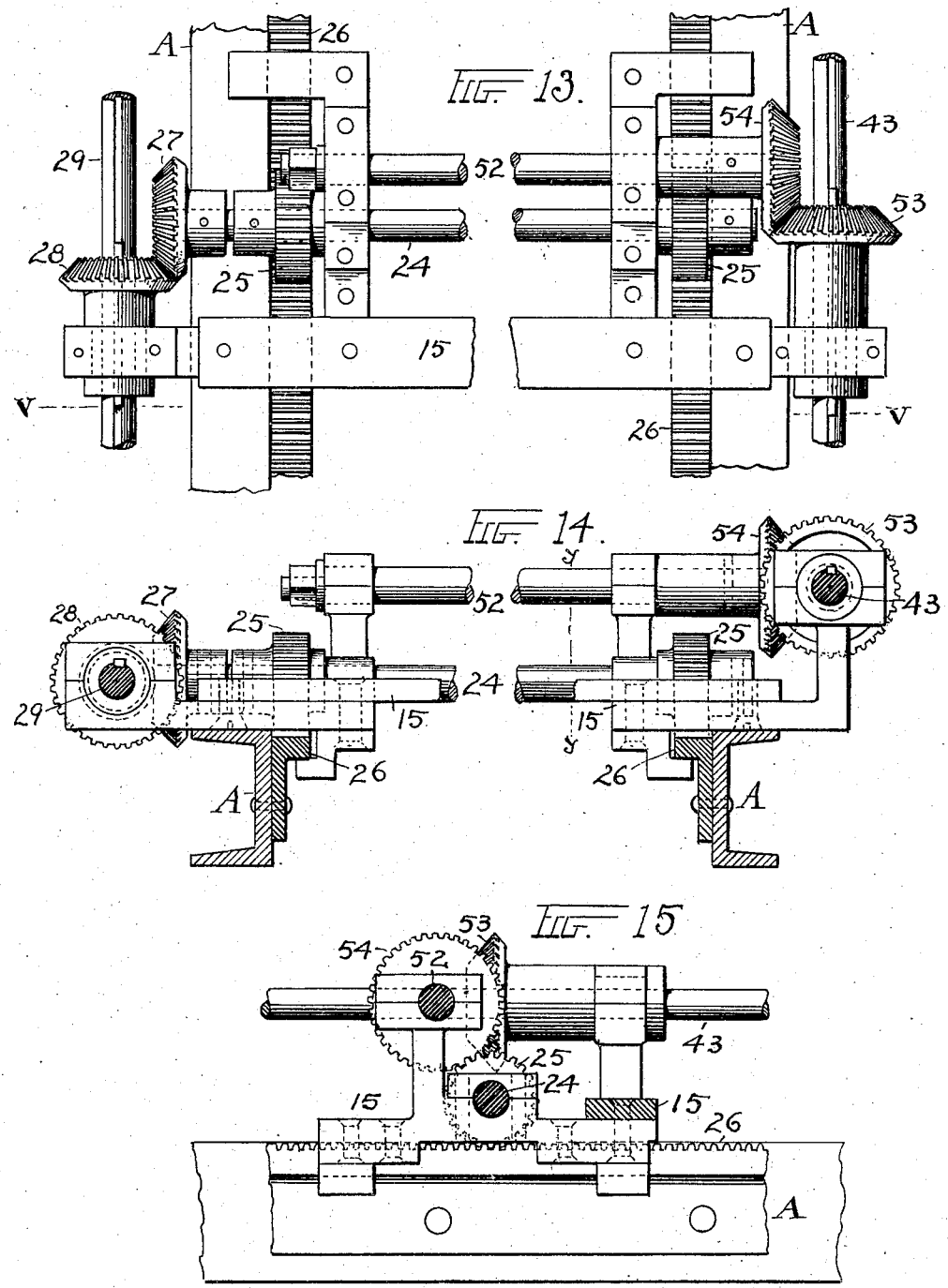

No. 785,314. PATENTED MAR. 21, 1905.
H. LUSCHAR.
CARVING MACHINE.
APPLICATION FILED DEC. 12, 1904.
11 SHEETS—SHEET 10.
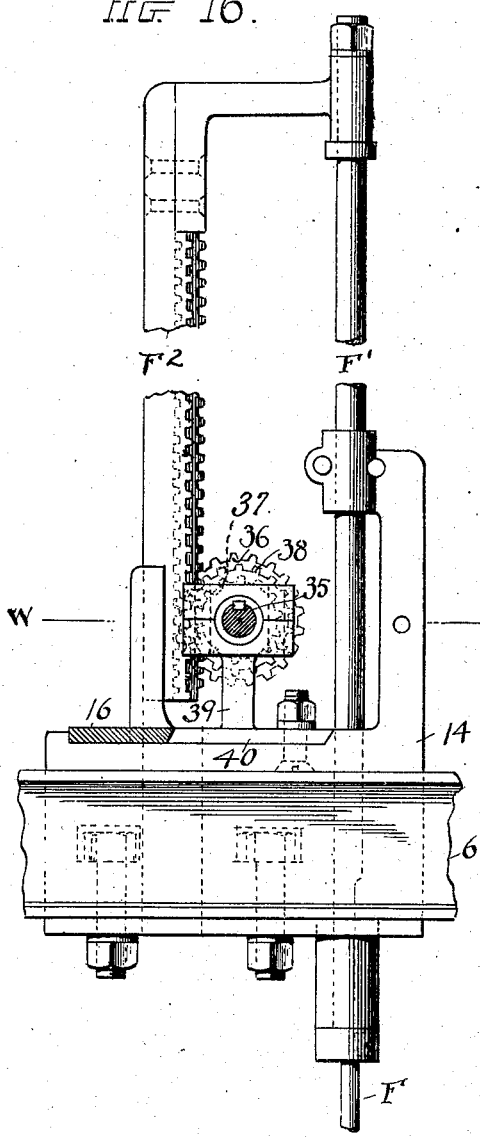
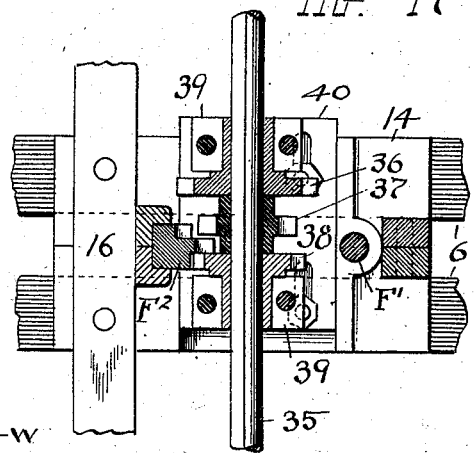
WITNESSES:
INVENTOR.
Hermann Luschar
BY H. J. Fisher
ATTORNEY.

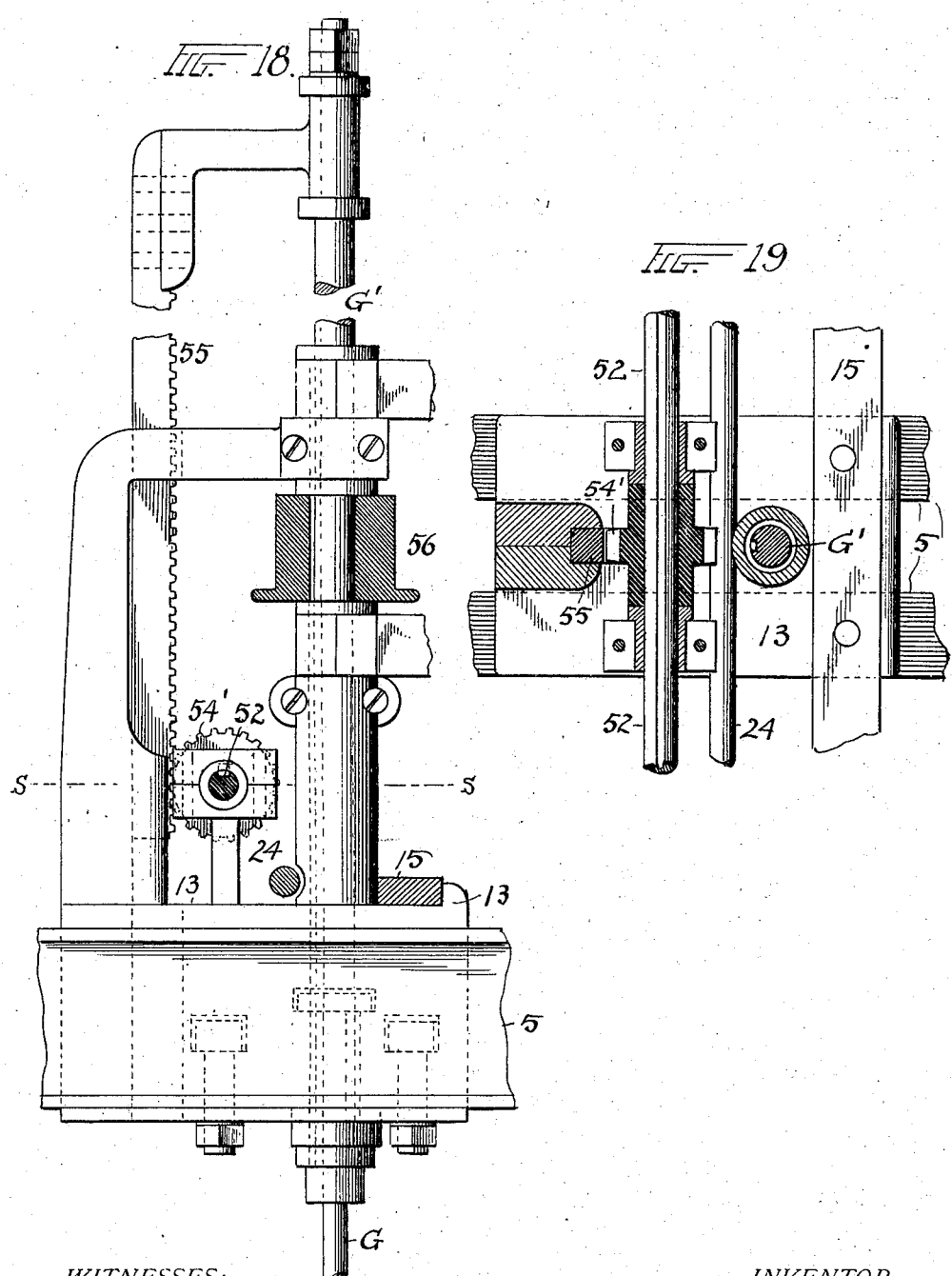

No. 785,314. Patented March 21, 1905.

UNITED STATES PATENT OFFICE.

HERMANN LUSCHAR, OF CLEVELAND, OHIO.

CARVING-MACHINE.

SPECIFICATION forming part of Letters Patent No. 785,314, dated March 21, 1905.

Application filed December 12, 1904. Serial No. 236,626.

*To all whom it may concern:*

Be it known that I, HERMANN LUSCHAR, a subject of the Emperor of Austria-Hungary, residing at Cleveland, in the county of Cuyahoga and State of Ohio, have invented certain new and useful Improvements in Carving-Machines; and I do declare that the following is a full, clear, and exact description of the invention, which will enable others skilled in the art to which it appertains to make and use the same.

My invention relates to improvements in carving-machines; and the invention consists in the construction and arrangement of parts substantially as hereinafter shown and described, and more particularly pointed out in the claims.

The object of the invention is embodied in a machine adapted to accurately produce articles, such as carvings, &c., in wood or stone from a pattern or model.

In the accompanying drawings, Figure 1 is a side elevation of my improved machine. Fig. 2 is an elevation of the opposite side of the machine shown in Fig. 1. Fig. 3 is an end elevation of the machine from the right of Fig. 2. Fig. 4 is an end elevation of the machine from the left of Fig. 2. Fig. 5 is a group view of three several tools used in connection with my machine. Fig. 6 is a group view in diagram of various stages of the cut made by the various tools from start to completion of the work and illustrating the various steps and the manner in which the work is performed. Fig. 7 is a plan view of the machine; and Fig. 8 is a plan view on line $x$ $x$, Fig. 1. Fig. 9 is a side elevation, somewhat enlarged, of the hand controlling-levers for actuating the gearing leading to the feed-screws which shift the sliding frames and tool-supports; and Fig. 10 is an end elevation thereof. Fig. 11 is a side elevation of the gearing and ratchet mechanism for the feed-screws operating the tool-carrying frame; and Fig. 12 is an end elevation thereof, partly in section. Fig. 13 is a plan view of the sliding frame for the cutting-tool, but broken away at its center and with the ends brought together, and showing the rack and top of the main frame and portions of the operating-shafts at each side of the machine. Fig. 14 is a cross-section on line $v$ $v$, Fig. 13; and Fig. 15 is an elevation on line $y$ $y$, Fig. 14. Fig. 16 is a side elevation, enlarged, of the supporting and operating mechanism for the tracing or outlining tool, which determines and locates the position of the cutting-tool. Fig. 17 is a horizontal sectional view on line $w$ $w$, Fig. 16. Fig. 18 is a side elevation and sectional view of the operating and supporting parts for the cutting-tool. Fig. 19 is a sectional view on line $s$ $s$, Fig. 18.

The main frame A of the machine is divided into two distinct portions 2 and 3, respectively, one above the other, and the upper part 2 of frame A is divided into two separate divisions by central cross-beam 4. The lower part 3 is also divided into two separate divisions by a central cross-beam $a$. Each of the divisions of the upper part 2 is bridged by a beam or frame 5 and 6, respectively, supported to slide independently from side to side of said machine in said divisions. Said frames 5 and 6 are each engaged and operated to slide back and forth by a set of feed-screws 7 and 8, respectively, each set of screws having a connecting-shaft 9 with bevel-gearing 10 to provide a uniform drive. Screws 7 and 8, located centrally between the ends of the machine, have pinions 11 and 12, respectively, geared to and driven by suitable mechanism, which is hand-controlled and as hereinafter more particularly described.

Each sliding frame 5 and 6 (see Fig. 7) is slotted centrally its full length and a sliding table or carriage 13 and 14, respectively, is provided to support the driving and carrying mechanism for each tool. Each carriage 13 and 14 is fastened to and part of a longitudinal moving frame or sliding support 15 and 16, respectively, and these longitudinal moving frames are connected by a set of links 17 and 18, which pivotally engage the free end of a bar 19, pivoted at 20 centrally of the machine upon the upper cross-beam 4 of the main frame. These links and bars provide operating connections between frames 15 and 16 to make them slide in the same direction and together. By shifting the pivot connections between bar 19 and frames 15 and 16 at each side—say by bringing them down to openings 22 in said bar and frames—a varying length of travel of frame 16 in respect to frame 15 is provided for. As shown, frame 15 is the initial sliding member, and its movement back and forth upon frame A is provided for by a cross-shaft 24, mounted thereon and having a pinion 25 at each end, which meshes with rack 26 upon the top and inner opposite sides of the main frame. Shaft 24 extends beyond one of the pinions 25 and has a beveled gear 27, meshing with gear 28, splined to slide on a longitudinal shaft 29, mounted in bearings upon the side of frame A, and which shaft is driven by beveled gear 30 and gear 31 on a vertical shaft 32 at one end of the machine, power being derived from hand-wheel 33, mounted on sleeve 34, which is free to revolve on shaft 35, supported in suitable brackets on the main frame. Beveled gearing upon the lower end of shaft 32 and upon sleeve 34 complete the train of power connections for shaft 29.

As seen in Fig. 8, the model and the work being operated upon are carried or supported either upon vertical movable tables B and C or between revolving chuck members D D' and E E', mounted above said tables and separately controlled or operated, as will hereinafter appear. The model or pattern is placed beneath and is contacted by a tracing or outlining tool F, which is carried at the lower end of vertical shaft F', which is movable up and down to accommodate the tool to the varying surface or inequalities of the model engaged by the tool. Every portion of the surface of the model or pattern is engaged at one time or another by the tool which is carried longitudinally and transversely over the surface of the pattern or the model when sliding frame 6 and carriage 14 are moved one way or the other.

All the movements of the outlining-tool are communicated in a predetermined ratio direct to the cutting-tool G. Thus the longitudinal movement of the outlining-tool is determined by a coacting movement between the respective longitudinally sliding-frames 15 and 16, and the transverse movement of the outlining-tool is transmitted to the cutting-tool by screws 7 and 8, which cause frames 5 and 6 to slide independently at a predetermined ratio of speed, and the vertical movement of the outlining-tool imparts a like movement to the cutting-tool G, but in a ratio as may be predetermined by setting suitable differential gears. The vertical coaction between the tools is accomplished by the following described mechanism: Thus, referring to Sheets 5 and 10, it will be noted that vertical shaft F' is free to slide in suitable bearings on carriage 14 and is actuated by a vertical rack-bar F², attached at its top to the end of shaft F' and also slidably supported upon carriage 14. A set of differential gears 36, 37, and 38, respectively, are splined to slide upon cross-shaft 35', and each gear has a corresponding row of gear-teeth upon bar F², with which it is adapted to mesh, said gears being supported between bearings 39 on adjustable plate 40, to permit shifting of the gears in respect to the rack-teeth. Shaft 35' is supported in bearings at opposite ends of sliding frame 16, and is provided with a bevel-gear 41 at one end, which meshes with beveled gear 42, splined to slide on a longitudinal shaft 43, mounted in bearings on the main frame. Shaft 43 has a beveled gear 44 at one end, which meshes with a beveled gear 45 on a vertical shaft 46 at one end of main frame A, and shaft 46 is operated by a pair of beveled gears 47, a pinion 48, and a segment-gear 49, in mesh with said pinion, said segment 49 being mounted on a shaft 50, supported in brackets upon the main frame and operatively controlled by a lever 51.

Referring to Fig. 7, it will be seen that the rotation of shaft 43 imparts a like rotation to a cross-shaft 52, carried by sliding frame 15, a bevel-gear 53, splined to slide on shaft 43, serving to convey power to bevel-gear 54 at the end of shaft 52. Shaft 52 passes through bearings on the sliding table or carriage 13, which supports the cutting-tool shaft G', a pinion 54' being splined to slide upon shaft 52 between said bearings, and meshing with the gear-teeth on rack-bar 55, which is attached at its upper end to the upper end of the tool-shaft G'. Any movement of the tracing or outlining tool F is conveyed to the cutting-tool G by means of the mechanism above described.

The cutting-tools used and as seen in detail Fig. 5 are preferably of the rotatable type, such as boring-augers, and shaft G' therefore requires suitable drive connections, which in this instance comprise a band-wheel 56, within which shaft G' is splined to slide, and which is held between brackets upon sliding carriage 13. Power is conveyed to said band-wheel by a belt 57, leading to pulley 58 on a vertical shaft 67, supported at the connecting ends of a set of links 59 and 60'. Said toggle-arms are supported at their other ends upon shaft G' and vertical shaft 61', respectively, said shaft 61' being supported in a fixed bearing mounted centrally of the machine upon beam 4. A bevel-gear 62' at the lower end of shaft 61' meshes with bevel-gear 63' on a short shaft 64', mounted in brackets upon main frame A and provided with power-pulleys 64ª at its upper end. Pulley 65' on vertical shaft 61' drives pulley 66' on shaft 67' by means of belts 68'. The power connections for drive-shaft G', as above described, permit both a longitudinal and transverse movement of carriage 13 with tool G under constant rotation. Now referring more specifically to the driving mechanism for screws 7 and 8 and as shown in enlarged detail Figs. 9 to 12, inclusive, I provide a train of gears H and I, respectively, for said shafts, and said gears are separately sleeved upon short shafts mounted at the side of the main frame. Thus pinion 11 on shaft 7 is in mesh with gear 60, which is driven by pinion 61, both being sleeved to revolve upon short shaft 62. Pinion 61 is driven by gear 63 and pinion 64, sleeved to rotate together on shaft 65. A gear 66, mounted upon sleeve 67, driven by ratchet-wheel 68, transmits power to pinion 64 either directly or indirectly through an intermediate pinion 85, mounted at the free end of arms 86, adapted to swing on sleeve 87 on shaft 65. Ratchet-wheel 68 is engaged by a pawl 69, mounted between swinging arms 70, which are connected by link 71 with upright arm 72, mounted on crank-shaft 73. Said crank-shaft is adapted to be tilted by lever 74. A series of bolt-holes 75 in arm 72 permits link 71 to be shifted higher or lower thereon, whereby more or less throw is obtained to rotate ratchet-wheel 68 more or less, and thereby increase or decrease the rotation of feed-screw 7. The train of gears I and their operating connections are identical with gears H and their connections and comprise gear 76, meshing with pinion 12 on feed-screw shaft 8, a pinion 77 to drive gear 76, a gear 78 and pinion 79 sleeved together on shaft 65 and directly driven by a gear 80, operated by a ratchet-wheel 81, or indirectly by said gear 80 through an intermediate pinion 79' on pivoted arms, as is the case with pinion 85. A link-and-pawl connection 82 for operating said ratchet-wheel leads to and is connected with upright arm 83 on crank-shaft 73 and corresponds to the operating connections for the first-described ratchet-wheel 68. A similar adjustable link connection is had with arm 83 as with arm 72 and link 71 to increase the throw, and thereby change the speed of rotation of feed-screw 8. Both links 71 and 82 may be connected to throw the same distance or varying distances by the same movement of lever 74, and thereby actuate the gear-driving mechanism and feed-screws and the transverse sliding frames 5 and 6, respectively, at the same speed or varying speeds. I also provide mechanism for reversing the rotation of screw-shafts 7 and 8, respectively, and in detail this mechanism comprises a pivoted rocking frame 88, (see Figs. 9 to 12, inclusive,) upon the free end of which gears 66 and 80 and ratchet-wheels 68 and 81 are mounted. Upright arms 89 pivotally engage the supporting swinging or rock arms of intermediate pinions 85 and 79', respectively, and are pivotally supported upon sleeve 67 of rock-frame 88. When said frame is raised, pinions 85 and 79' are also raised, but in a greater degree, owing to the short fulcrum of the rock-arms for the pinions, as compared with the longer fulcrum of rock-frame 88, which has its pivotal support upon the axially-alined end portions of crank-shaft 73. The result is to throw pinions 85 and 79' out of mesh with gears 66 and 80, respectively, and bring said gears in mesh with pinion 64 and 79, respectively, and thereby reverse the movement of the feed-screws. The means for supporting and raising and lowering rocking frame 88 comprises a short shaft 90, supported in brackets mounted upon the main frame and provided with a set of crank-arms 91, with links 92 attached to ears on said frame 88. A connecting-bar 93 is fastened at one end to an arm 94 on shaft 90 and attached at its other end to a short crank-arm 95 on short shaft 96, mounted in bearings on the main frame and provided with a counterweighted arm 97 to throw said shaft and connections from one position to the other and to hold them in either position. Stops 98 limit the throw of arm 97. Crank-shaft 73 is also provided with a counterweighted arm 99 and stop-arms 100 to govern the extreme positions to which lever 74 may be thrown.

The mechanism mounted upon the middle elevation or portion 3 of main frame A (see Fig. 8) relates more especially to the supporting means for the model and the work. Two separate and distinct means for supporting the work are shown, either of which may be used according to the character of the work in hand. The first comprises a pair of vertically-movable tables or supports B and C, respectively, upon which the model and the work under the cutting-tool are fastened in any suitable manner, and a set of vertically-arranged feed-screws 103 and 104, respectively, are used to raise and lower each table independently. Said screws have each a bevel-gear 102, meshing with bevel-gears on separate sets of horizontal shafts 105, mounted on the main frame, and each set of shafts for each table has a cross-shaft 106 with bevel-gearing to operate shafts 105 and with an extension 107, adapted to be engaged and revolved by a crank-handle or any suitable power connection. Tables B and C are used principally when the model and work are adapted to be fastened rigidly in place, and operations are carried on upon the upper exposed surface.

For cylindrical pieces, or where more than one side or surface is to be operated upon, I prefer to use a rotatable support for the model and work and which in this instance comprises revolving chuck members D D' and E E'. Members D' and E' are mounted upon separate supports 110 and 111, slidably supported upon the cross-beams of the main frame at its middle portion 3 and operated by separate sets of transversely-arranged screw-shafts 112 and 113, respectively, each set of which is geared together by bevel-gearing and connecting-shafts 114 and 115 at one side of the machine. A removable crank-handle 116 may be used to engage extensions of the transverse shafts and to rotate the same as may be needed in adjusting the parts to the work. Chuck members D and E are jointly driven by separate worms 117 and 118, meshing with gears 119 and 120, respectively, and said worms are mounted on a longitudinally-arranged shaft 121, mounted in bearings on the side of the main frame A and driven by a bevel-gear 122 at one end, which meshes with a bevel-gear 123 on shaft 35, said shaft being rotated by hand-wheel 124. Referring to Fig. 1, worm 117 is sleeved upon shaft 121 and is either free to revolve thereon or fastened thereto by a set-screw. A bevel-gear 126 at one end of worm 117 meshes with a bevel-gear 127 on a short vertical shaft 128, mounted upon an adjustable bracket 129, and gear 127 is driven by bevel-gear 130 on shaft 121. When gear 127 is raised and out of mesh with gear 126 and 130, all the chuck members are rotated in the same directions; otherwise they rotate reversely.

The weight of the tool-carrying parts bearing upon the model and work is offset in a measure by a counterweight 135, adapted to slide upon vertical rods 136, fastened at one end of main frame A beneath sheave 137 upon the end of longitudinal drive-shaft 43. A flexible connection for counterweight 135 is wound and unwound over sheave 137 as shaft 43 is rotated, and every up-and-down movement of the tool is communicated to and balanced by the counterweight.

In operation the machine is controlled entirely by hand and the several different trains of mechanisms hereinbefore described are separately set in motion as the work progresses, except the driving mechanism for the cutting-tool, which is under constant rotation. Thus when the model is in place beneath outlining-tool F the work to be carved is in a relatively similar position beneath cutting-tool G. If the chuck members are being used for holding the model and work, hand-wheel 124 is rotated to cause a joint movement of the chuck members to shift their relative positions beneath the outlining-tool and the cutting-tool, respectively, in as great a degree as the operator may desire. If tables B and C are in use, the extensions 107 of shafts 106 are separately engaged by a crank-handle to rotate the same, and thereby raise or lower the tables to the required height and bring the model into or out of working relation with the tools above. The shifting of both tools laterally in respect to the machine and over the model and work is obtained by operating lever 74, which actuates the train of mechanism leading to the screw-shafts 7 and 8, respectively, and wherewith sliding frames 5 and 6 are moved back and forth. The shifting of both tools longitudinally of the machine is brought about by rotating hand-wheel 33, and thereby setting in motion the train of mechanism which actuates longitudinally-slidable frame 15 and through which joint movement is imparted to longitudinally-slidable frame 16 by means of link-and-lever connections 17, 18, and 19. The raising and lowering of both tools is jointly brought about by throwing lever 51 more or less and which transmits its movement by trains of mechanism, as hereinbefore fully described, to the respective tool-shafts for tools F and G. Thus the several hand levers or wheels 51, 33, 74, and 124 provide for independent control and action of various trains of mechanism whereby a carving-tool is mechanically operated to reproduce articles of manufacture from models or patterns.

What I claim is—

1. In a machine for reproducing articles from models, a main frame divided into separate divisions and a laterally-sliding frame in each division, a carrier supported to slide longitudinally on each frame, a vertically-movable tool-support upon each carriage, and means to operate said frames, carriages and tool-supports.

2. In a machine for reproducing articles from models, a main frame and separate frames mounted to slide laterally on said main frame, carriers on said sliding frames adapted to slide longitudinally thereon, a vertically-movable tool-support on each carrier, rack-and-gear mechanisms for operating said tool-supports, connecting mechanism for producing joint action between said carriers, and feed-screw mechanism for said sliding frame.

3. In a machine for reproducing articles from models, a main frame provided with a pair of slidable frames at its top adapted to traverse from side to side thereof over separate divisions of said frame, a sliding carrier on each frame, a vertically-movable tool-support slidably mounted upon each carrier, one of said tool-supports having differential gear-operating connections, means to provide joint action between said carriers, means to produce joint action between said tool-supports, and means to jointly operate said sliding frames back and forth on said main frame.

4. In a machine for reproducing articles from models, a main frame provided with a pair of slidable frames at its top adapted to traverse from side to side thereof, a sliding carrier on each sliding frame, a vertically-movable tool-support slidably mounted upon each carrier, mechanism to produce joint action between said tool-supports, means to jointly operate said sliding frames back and forth on said main frame, an outlining-tool carried by one of said supports and a cutting-tool for the other support, and means to drive said cutting-tool.

5. In a machine for reproducing articles from models, a main frame divided into open divisions at its top and a laterally-movable frame in each division, a longitudinally-sliding carrier on each laterally-movable frame, a tool-supporting shaft and rack-and-gear mechanism therefor on each carrier, power connections for rotating one of said shafts and a train of mechanism between said rack-and-gear mechanism to raise and lower both shafts simultaneously, a train of mechanism between said sliding carriers to jointly operate said carriers, and a train of mechanism between said movable frames to jointly actuate said frames transversely of the main frame.

6. In a machine for reproducing articles from models, a main frame and a pair of frames slidably supported to traverse from side to side thereof, a sliding carrier on each sliding frame adapted to traverse longitudinally thereon, a tool-supporting shaft having rack-and-gear mechanism to raise and lower said shaft mounted on each sliding carrier, a cross-shaft supported in bearings on each carrier having beveled gears at one side of said machine, a longitudinal shaft and beveled gearing splined to slide on said shaft and adapted to mesh with said gears on said cross-shafts, and hand-lever and gear connections to rotate said longitudinal shaft.

7. In a machine for reproducing articles from models, a main frame and a set of tool-supporting frames slidably supported thereon, a set of feed-screws for each sliding frame, and separate drive connections for each set of feed-screws comprising gear-and-ratchet mechanism and hand-operating links and levers therefor.

8. In a machine for reproducing articles from models, a main frame and a set of tool-supporting frames slidably supported thereon, a set of feed-screws for each sliding frame, a separate train of drive-gears for each set of feed-screws, operating-lever connections for said gears, and lever-reversing mechanism for said gears and feed-screws.

9. In a carving-machine, a main frame and a set of tool-supporting frames slidably mounted thereon, a set of feed-screws for each sliding frame, separate trains of drive-gears for each set of screws, separate ratchet-wheels and pawls for said gears, a lever, and individual links for said pawls adjustably connected with said lever.

10. In a machine for reproducing articles from models, a main frame and a set of frames mounted to slide transversely of said frame, and feed-screw mechanism to operate the same, a set of tool-carrier frames mounted to slide longitudinally on said transversely-sliding frame, link-and-lever connections between said tool-carrier frames and rack-and-gear mechanism to move one of said carriers longitudinally of the main frame, a tool-supporting shaft mounted to slide vertically upon each of said carriers and rack-and-gear mechanism to raise and lower said shafts at a predetermined rate of movement in respect to each other.

11. In a machine for reproducing articles from models, a main frame and a set of tool-supporting frames mounted to slide transversely and longitudinally thereon, tool-shafts and mechanism for lowering and raising the same on said sliding frames, and means to move said sliding frames to shift said tool-shafts, in combination with a set of supporting members mounted beneath said sliding frames and adapted to hold the model and the work.

12. In a machine for reproducing articles from models, a main frame and a pair of sliding frames mounted to travel transversely upon said frame, feed-screws for each sliding frame, independent trains of gear-and-ratchet mechanism for each set of feed-screws, link-and-lever connections for said mechanisms, separate slidable carrier-frames and tool-supporting shafts on said sliding frames, link connections between said separate carrier-frames and a rack-and-gear mechanism to shift said carrier-frames longitudinally of the main frame, rack-and-gear mechanisms to raise and lower said tool-supporting shafts, and power connections for rotating one of said tool-shafts, in combination with supporting members for the model and the work mounted beneath said sliding frames.

13. In a machine for reproducing articles from models, a main frame and a pair of transversely-slidable frames thereon and a pair of longitudinally-slidable tool-supports upon said transversely-slidable frames, and a vertically-movable tool-shaft arranged at the top of said main frame, in combination with a set of chuck members for holding the model and work mounted on said main frame, and mechanism for jointly operating said set of chuck members.

14. In a machine for reproducing articles from models, a main frame and a pair of slidable frames mounted at its top and adapted to slide independently from side to side of said frame, an independent train of screw-feed and gear mechanism for each of said sliding frames and link-and-lever mechanism for operating said feed mechanisms, a tool-shaft and a sliding carrier therefor mounted to travel longitudinally on each sliding frame, means to raise and lower said tool-shafts jointly, means to provide a joint travel of said longitudinally-sliding tool-carriers, and suitable independent supports for both the model and the work under operation.

15. In a carving-machine, a main frame and separate sets of transversely and longitudinally slidable tool-supporting frames mounted thereon, and means to operate like slidable frames of each set back and forth together, in combination with a set of rotatable chuck members mounted upon said main frame beneath said sliding frames, and drive mechanism for said members.

In testimony whereof I sign this specification in the presence of two witnesses.

HERMANN LUSCHAR.

Witnesses:
C. A. SELL,
R. B. MOSER.